United States Patent
Lepper (10) Patent No.: US 10,494,842 B2
(45) Date of Patent: Dec. 3, 2019

(54) VEHICLE LOAD FLOOR LATCH ASSEMBLY

(71) Applicant: Illinois Tool Works Inc., Glenview, IL (US)

(72) Inventor: Mark O. Lepper, Oak Park, IL (US)

(73) Assignee: Illinois Tool Works Inc., Glenview, IL (US)

(*) Notice: Subject to any disclaimer, the term of this patent is extended or adjusted under 35 U.S.C. 154(b) by 195 days.

(21) Appl. No.: 15/551,390

(22) PCT Filed: Feb. 8, 2016

(86) PCT No.: PCT/US2016/017017
§ 371 (c)(1),
(2) Date: Aug. 16, 2017

(87) PCT Pub. No.: WO2016/144458
PCT Pub. Date: Sep. 15, 2016

(65) Prior Publication Data
US 2018/0066463 A1 Mar. 8, 2018

Related U.S. Application Data

(60) Provisional application No. 62/130,880, filed on Mar. 10, 2015, provisional application No. 62/156,975, filed on May 5, 2015.

(51) Int. Cl.
*B60R 5/04* (2006.01)
*E05C 3/04* (2006.01)
(Continued)

(52) U.S. Cl.
CPC .......... *E05C 3/046* (2013.01); *B60R 5/04* (2013.01); *E05B 9/02* (2013.01); *E05B 63/123* (2013.01);
(Continued)

(58) Field of Classification Search
CPC .......... E05C 3/046; E05C 3/047; B60R 5/04
(Continued)

(56) References Cited

U.S. PATENT DOCUMENTS

| 1,427,658 A | * | 8/1922 | Ventre .................. E05B 63/123 |
| | | | 292/207 |
| 2,732,970 A | * | 1/1956 | Hogan et al. ......... B64C 1/1446 |
| | | | 220/302 |

(Continued)

FOREIGN PATENT DOCUMENTS

| DE | 102005047713 | 4/2007 |
| WO | WO 89/02021 | 3/1989 |

OTHER PUBLICATIONS

International Search Report and Written Opinion for PCT/US2016/017017.

*Primary Examiner* — Dennis H Pedder
(74) *Attorney, Agent, or Firm* — Quarles & Brady LLP (57) ABSTRACT

A latch assembly (100, 300) is configured to removably secure a load floor (14) within a cargo area (12) of a vehicle (10). The latch assembly (100, 300) may include a housing (102, 306) defining an opening (130, 318). The housing (102, 306) is configured to secure to the load floor (14). A latch (104, 302) is rotatably secured to the housing. The latch (104, 302) may include a central hub and opposed latching rims (114, 350) extending radially outward from the central hub. The latch (104, 302) is configured to be rotated in relation to the housing (102, 306) in both a clockwise direction and counterclockwise direction to move either of the latching rims (114, 350) out of the housing (102, 306) into an engagement position. The latch assembly (100, 300) is configured to secure to a portion of the vehicle (10) when either of the latching rims (114, 350) is in the engagement position.

20 Claims, 6 Drawing Sheets (51) Int. Cl.
    *E05B 63/12*     (2006.01)
    *E05B 65/00*     (2006.01)
    *E05B 9/02*     (2006.01)
    *E05B 85/24*     (2014.01)

(52) U.S. Cl.
    CPC ............ *E05B 65/006* (2013.01); *E05B 85/24* (2013.01); *E05C 3/042* (2013.01)

(58) Field of Classification Search
    USPC .................. 296/193.07, 37.14, 37.16, 184.1; 292/194, 195, 213, 214, DIG. 63
    See application file for complete search history.

(56) References Cited

U.S. PATENT DOCUMENTS

| | | | | |
|---|---|---|---|---|
| 4,676,370 A * | 6/1987 | Rudick | ................ | G11B 23/027 206/1.5 |
| 6,695,380 B1 * | 2/2004 | Hicks | ........................ | B60R 5/04 296/37.14 |
| 8,215,693 B2 * | 7/2012 | Ulita | ........................ | B60R 7/02 296/37.1 |

\* cited by examiner

VEHICLE LOAD FLOOR LATCH ASSEMBLY

RELATED APPLICATIONS

This application is a National Phase of International Application No. PCT/US2016/017017, filed Feb. 8, 2017, which relates to and claims priority benefits from U.S. Provisional Patent Application No. 62/130,880 entitled "Latch Assembly," filed Mar. 10, 2015, both of which are hereby incorporated by reference in their entireties.

International Application No. PCT/US2016/017017 also relates to and claims priority benefits from U.S. Provisional Patent Application No. 62/156,975 entitled "Latch Assembly," filed May 5, 2015, which is also hereby incorporated by reference in its entirety.

FIELD OF EMBODIMENTS OF THE DISCLOSURE

Embodiments of the present disclosure generally relate to latch assemblies, and, more particularly, to latch assemblies that may be used with respect to secure a load floor within a cargo area of a vehicle.

BACKGROUND

Various vehicles have cargo areas that may include a load floor. A rear window, door, trunk, or the like of an automobile, for example, may be opened to expose the cargo area. The load floor includes a structural base or surface, which is often covered with carpet or felt. The load floor may cover a spare tire, utility equipment, and/or the like. The load floor provides a flat surface configured to support items within a cargo area. Typically, a load floor is hinged or removable to allow access to the spare tire, tools, and/or additional space underneath.

In order to secure the load floor in place (to prevent it from becoming a projectile in the event of a crash), some known systems utilize an overlap from a liftgate/hatch over a rear edge of the load floor. However, such systems take up space within the cargo area. In short, known systems for securing a load floor in position can be bulky and obtrusive.

SUMMARY OF EMBODIMENTS OF THE DISCLOSURE

A need exists for a compact and efficient system and method of removably securing a load floor within a cargo area of a vehicle. Further, a need exists for a system and method that may quickly and efficiently secure a load floor within the cargo area in multiple orientations.

With those needs in mind, certain embodiments of the present disclosure provide a latch assembly that is configured to removably secure a load floor within a cargo area of a vehicle. The latch assembly may include a housing defining an opening. The housing is configured to secure to the load floor. A latch is rotatably secured to the housing. The latch may include a central hub and opposed latching rims extending radially outward from the central hub. The latch is configured to be rotated in relation to the housing in both a clockwise direction and counterclockwise direction to move either of the latching rims out of the housing into an engagement position. The latch assembly is configured to secure to a portion of the vehicle when either of the latching rims is in the engagement position.

The latch assembly may be configured to removably secure the load floor to the portion of the vehicle in at least two different orientations. The latch operates to secure to the portion of the vehicle in the same manner when the load floor is in each of the at least two different orientations. The latch may be symmetrical about a central longitudinal axis.

In at least one embodiment, the housing may include a base secured to a cover. The base may mirror the cover.

The central hub may include an upstanding rib between two cavities exposed through the opening. The rib provides an engagement member that is configured to be grasped by an individual to rotate the latch in relation to the housing.

The housing may include a rim passage at an end. The rim passage allows each of the latching rims to move out of the housing.

Each of the latching rims may include an arcuate engaging wall extending above and below a recessed panel that extends radially outward from the central hub.

A portion of the vehicle may include a retaining passage that is sized and shaped to conform to a profile of the latching rims.

The housing may include a plurality of flanges that radially extend towards the opening. The central hub may include a plurality of arcuate tabs extending radially outward from the central hub. The plurality of flanges rotatably engage the tabs to rotatably secure the latch to the housing. In at least one embodiment, at least one of the flanges may include a resilient member that is configured to cooperate with a reciprocal feature on at least one of the arcuate tabs to index the latch with respect to the housing.

Certain embodiments of the present disclosure provide a securing system within a cargo area of a vehicle. The securing system may include a load floor removably secured within the cargo area. The load floor includes a first surface that is opposite from a second surface. The load floor is configured to be selectively flipped between first and second orientations that expose the first and second surfaces, respectively. A latch assembly is secured to the load floor. The latch assembly removably secures the load floor to a portion of the vehicle in the first and second orientations.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a rotational latch assembly that may be secured to a load floor. In at least one embodiment, the load floor may be reversible. For example, one side of the load floor may be carpeted, while an opposite side may be rubberized with upstanding barriers that are configured to contain water, mud, and the like. The rotational latch assembly is configured to secure the load floor to a portion of a vehicle (such as a fixed structural frame defining a portion of the cargo area) in both positions, such that a first side (which may have a carpeted surface) may be in an upward facing orientation, or a second side (which may have a rubberized surface) that is opposite the first side may be in an upward facing orientation.

Certain embodiments of the present disclosure provide a latch assembly having a symmetrical latch that is configured to provide a reversible load floor with the same fastening method on both sides of the load floor. The latch assembly provides simple, intuitive operation. Further, the latch assembly provides multi-directional latch control (e.g., clockwise or counter-clockwise operation).

Figure 1:
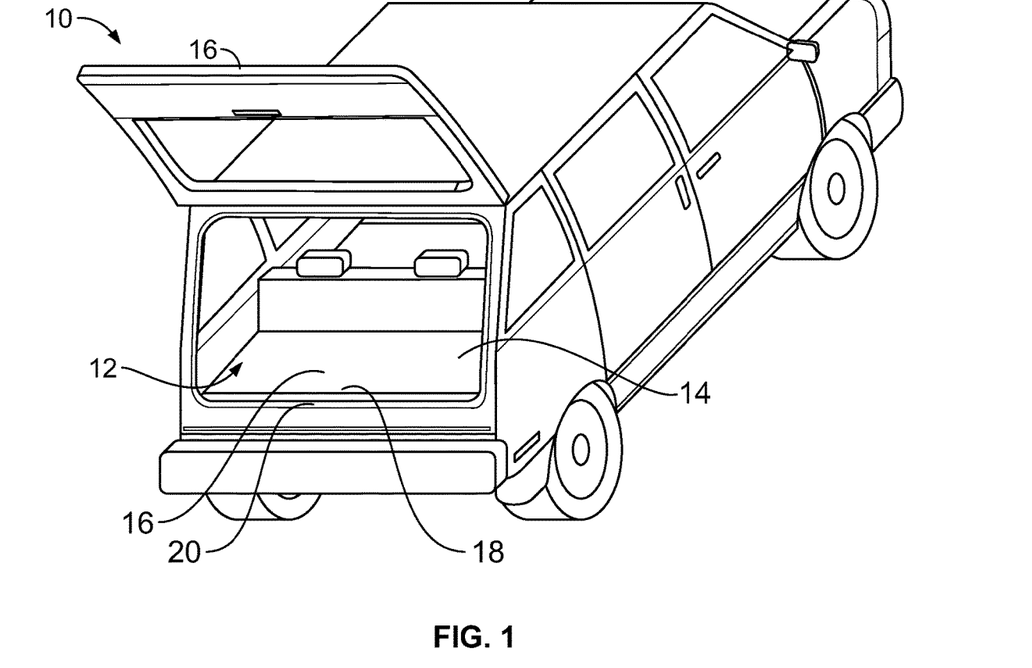
FIG. 1 illustrates a perspective rear view of a vehicle.

FIG. 1 illustrates a perspective rear view of a vehicle 10, such as a car, truck, sport utility vehicle, van, bus, and/or the like. The vehicle 10 includes a cargo area 12, which includes a load floor 14. A rear access door 16 is opened to expose the cargo area 12. The load floor 14 includes a first surface 16, which may be covered with carpet or felt. As shown in FIG. 1, the first surface 16 is upwardly-oriented and exposed within the cargo area 12. The load floor 14 may cover a spare tire, utility equipment, and/or the like (not shown). The load floor 14 provides a flat surface configured to support items within the cargo area 12.

The load floor 14 is secured in position within the cargo area by a latch assembly (not shown in FIG. 1). The latch assembly rotatably secures to an end 18 of the load floor 14 and is configured to securely couple to a portion of a frame 20 proximate to an opening of the cargo area 12. In order to remove the load floor 14, the latch assembly may be rotated into a disengaged position, which uncouples the latch assembly from the portion of the frame 20. When the latch assembly is in the disengaged position, the load floor 14 may be removed, and reversed (that is, flipped upside down) to expose a second surface (not shown in FIG. 1) that is opposite the first surface 16. The second surface may include a rubberized outer surface, for example.

The latch assembly cooperates with the load floor 14 to provide a securing system within the cargo area 12 of the vehicle 10. The securing system removably secures the load floor 14 within the cargo area 12 between multiple positions using the same latch assembly.

Figure 2:
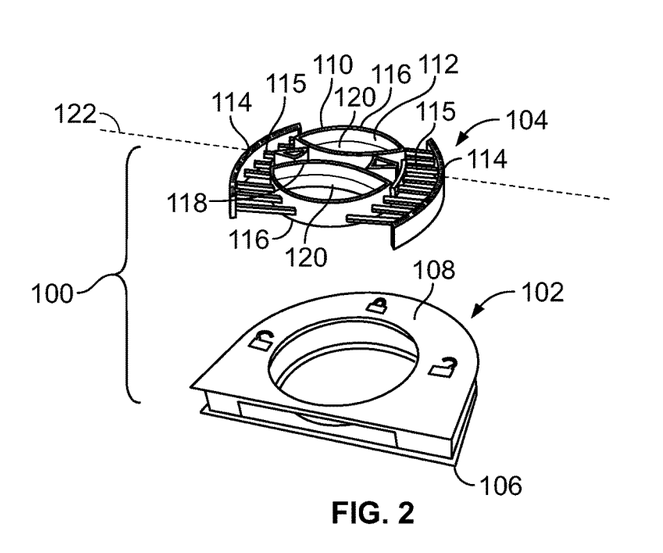
FIG. 2 illustrates a perspective top, partially exploded view of a latch assembly, according to an embodiment of the present disclosure.

FIG. 2 illustrates a perspective top, partially exploded view of a latch assembly 100, according to an embodiment of the present disclosure. The latch assembly 100 includes a housing 102 and a rotatable latch 104. The housing 102 may be formed of two pieces, such as a base 106 and a cover 108. The base 106 and the cover 108 may mirror one another. The base 106 and the cover 108 may securely couple to one another through one or more snap connections, latches, fasteners, adhesives, and or the like.

The latch 104 includes a main body 110 that includes a central hub 112 and opposed latching rims 114 extending radially outward from opposite sides of the central hub 112. As shown, centers of the latching rims 114 may be spaced 180 degrees apart from one another. The latching rims 114 mirror one another. Recesses 116 separate the latching rims 114 from one another.

An upstanding rib 118 extends through the hub 112. The central rib 118 may extend between the opposed latching rims 114. Cavities 120 are formed on either side of the central rib 118. The latch 104 may be symmetrical about a central longitudinal axis 122 that is parallel with, and bisects, the central rib 118. Both top and bottom surfaces of the latch 104 may be the same, so that a user may grasp and rotate the latch 104 from either surface.

Figure 3:
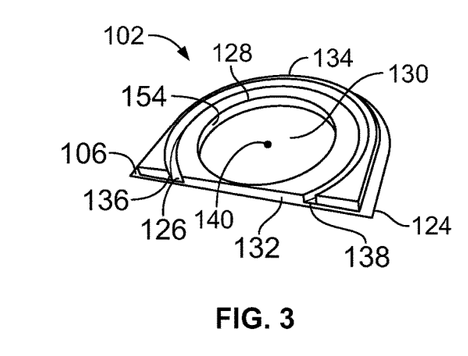
FIG. 3 illustrates a perspective top view of a base of a housing, according to an embodiment of the present disclosure.

FIG. 3 illustrates a perspective top view of the base 106 of the housing 102, according to an embodiment of the present disclosure. The base 106 includes a support panel 124 that may have a semi-circular channel 126 substantially surrounding an interior ridge 128 that surrounds a circular opening 130. A proximate end 132 of the support panel 124 may be straight, flat, and/or the like. A distal end 134 of the support panel 124 may be rounded. Opposite ends 136 and 138 of the channel 126 are exposed (that is, open) at the proximate end 132. As shown, the channel 126 may extend over an arcuate sweep of approximately 315 degrees in relation to a center 140 of the opening 130. Optionally, the channel 126 may extend over an arcuate sweep that is greater or less than 315 degrees.

Figure 4:
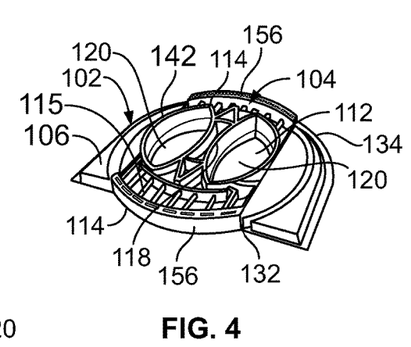
FIG. 4 illustrates a perspective top view of a latch secured to a base of a housing, according to an embodiment of the present disclosure.

FIG. 4 illustrates a perspective top view of the latch 104 secured to the base 106 of the housing 102, according to an embodiment of the present disclosure. In order to secure the latch 104 to the base 106, the central hub 112 is positioned within the circular opening 130 (shown in FIG. 3), which provides a reciprocal shape to the outer circumference of the hub 112. For example, an outer wall 142 may rotatably abut against an internal edge 154 (shown in FIG. 3) of the ridge 128 that defines the central opening 130.

Each latching rim 114 may include an arcuate engaging wall 156 that extends above and below a flattened recessed panel 115 extending radially outward from the central hub 112. As shown, a bottom portion of the engaging wall 156 of one of the latching rims 114 is rotatably retained within the channel 126 proximate to the distal end 134 of the base 106, while the engaging wall 156 of the opposite latching rim 114 is exposed through a passage formed through the proximate end 132 of the base 106.

Figure 5:
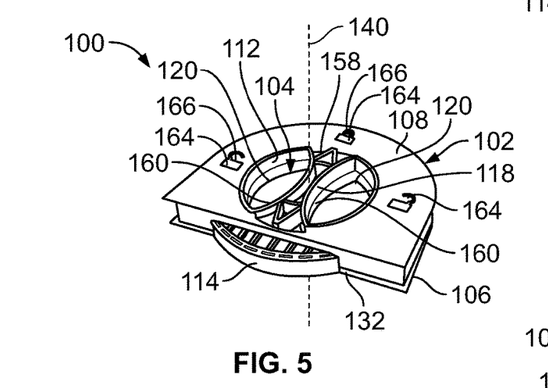
FIG. 5 illustrates a perspective top view of a latch rotatably secured to a housing such that a latching rim of the latch is exposed through a proximal end of the housing in an engagement position, according to an embodiment of the present disclosure.

FIG. 5 illustrates a perspective top view of the latch 104 rotatably secured to the housing 102 such that one of the latching rims 114 of the latch 104 is exposed through the proximal end 132 of the housing 102 in an engagement (or latching) position, according to an embodiment of the present disclosure. The cover 108 may mirror the base 106, as noted above. The cover 108 also defines a circular opening 158 through which the central hub 112 of the latch 104 is exposed. Accordingly, the central rib 118 may be grasped by an individual through the opening 158 or the circular opening 130 of the base 106. The central rib 118 provides a graspable member (such as a handle).

Interior walls 160 of the central rib 118 may be inwardly bowed, arched, curved, or the like (such as concave surfaces). In this manner, the interior walls 160 may be ergonomically shaped to provide a graspable handle that may be easily grasped and manipulated by an individual. For example, a finger and thumb may be positioned on opposite sides of the central rib 118 and extend into the cavities 120. The individual may then rotate the latch 104 about a center 140 of the latch assembly 100 in either a clockwise or counterclockwise direction.

As shown, the cover 108 may snapably secure to the base 106 to fully form the housing 102. For example, the cover 108 may include slots 164 that may retain tabs 166 extending from the base 106, or vice versa. Optionally or alternatively, the cover 108 may secure to the base 106 through fasteners, adhesives, latches, and/or the like. In at least one other embodiment, the housing 102 may be integrally molded and formed as a single one-piece unit, such as a single piece of injection molded plastic. For example, the housing 102 may be molded around the portions of the latch 104.

Figure 6:
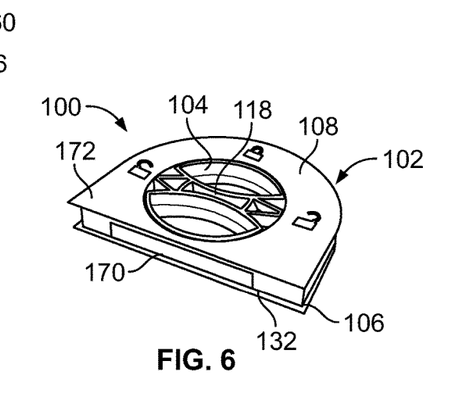
FIG. 6 illustrates a perspective top view of a latch rotatably secured to a housing such that latching rims of the latch are within the housing in a disengaged position, according to an embodiment of the present disclosure.

FIG. 6 illustrates a perspective top view of the latch 104 rotatably secured to the housing 102 such that latching rims 114 (hidden from view in FIG. 6) of the latch 104 are within the housing 102 in a disengaged position, according to an embodiment of the present disclosure. As shown, the latch 104 has been rotated 90 degrees in relation to the engagement position shown in FIG. 5. For example, an individual may grasp the central rib 118 and rotate the latch 104 relative to the housing 102 into the disengaged position shown in FIG. 6. In the disengaged position, neither of the latching rims 114 (hidden from view in FIG. 6) extend through a rim passage 170 defined by the proximal end 132 of the base 106 and a proximal end 172 of the cover 108. In the disengaged position, the latch 104 is configured to be disengaged from a portion of the frame 20 of the vehicle 10 (shown in FIG. 1). In the engagement position (shown in FIG. 5), the latch 104 is configured to securely latch onto the portion of the frame 20.

Figure 7:
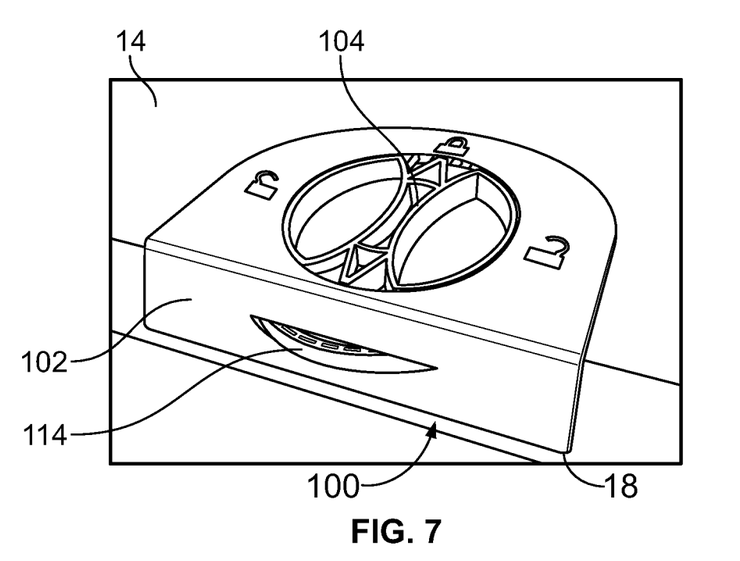
FIG. 7 illustrates a perspective top view of a latch assembly secured to a load floor, according to an embodiment of the present disclosure.

FIG. 7 illustrates a perspective top view of the latch assembly 100 secured to the load floor 14, according to an embodiment of the present disclosure. The load floor 14 may include a reciprocal channel at the end 18 that is configured to securely retain the latch assembly 100, such as through one more fasteners, adhesives, snaps, latches, and/or the like. As such, the rim passage 170 of the housing 102 may be exposed at the end 18. Optionally, a panel extending over the end 18 may be positioned over the end of the latch assembly, and may include an opening that is shaped the same, and aligned with the rim passage 170 of the housing 102.

Figure 8:
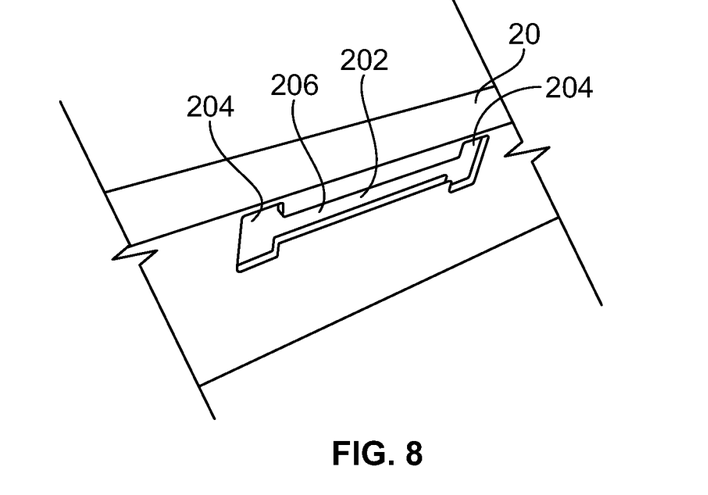
FIG. 8 illustrates a perspective top view of a portion of a frame having an latch opening, according to an embodiment of the present disclosure.

FIG. 8 illustrates a perspective top view of a portion of the frame 20 having a latch opening 202, according to an embodiment of the present disclosure. The latch opening 202 is shaped to conform to a profile of the latch 104 of the latch assembly 100 (shown in FIG. 2, for example). As such, the latch opening 202 includes end channels 204 connected to a central channel 206 that spans between the opposite channels 204. The end channels 204 may extend above and below a level of the central channel 206. The channels 204 are configured to allow passage of the latching rims 114, while the central channel 206 allows passage of recessed panels 115 of the latching rims 114 that connect to the main body 110 (as shown in FIGS. 2 and 4, for example).

As shown, the frame 20 (or another portion) of the vehicle 10 (shown in FIG. 1) may include a dogbone or H-shaped retaining passage, such as the latch opening 202, that is configured to retain the latching rim 114 of the latch 104, as described below. The latch opening 202 is configured to capture a reciprocally-shaped portion (such as the latching rim 114) of the latch 104 and limits movement thereof fore/aft, up/down, left/right, but allows the latch 104 to be rotated as desired.

Figure 9:
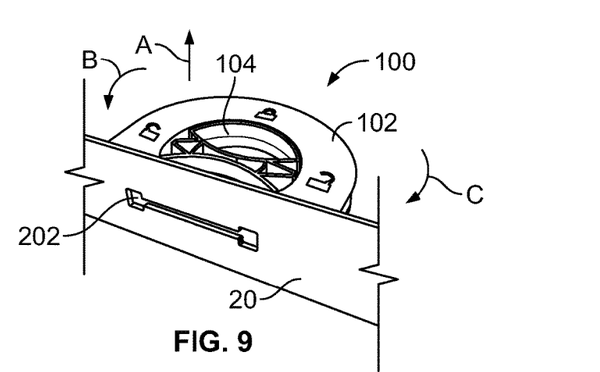
FIG. 9 illustrates a perspective top view of a latch assembly disengaged from a frame, according to an embodiment of the present disclosure.

FIG. 9 illustrates a perspective top view of the latch assembly 100 disengaged from the frame 20, according to an embodiment of the present disclosure. For the sake of clarity, the load floor 14 is not shown in FIG. 9, but it is to be understood that the latch assembly 100 is to be secured to the load floor 14, as described above. As shown in FIG. 9, the latch assembly 100 is in the disengaged position, such that the latching rims 114 (hidden from view in FIG. 9) do not extend outwardly from the latch assembly 100 into the latch opening 202 of the frame 20. In this position, the latch assembly 100 (and the load floor 14 secured to the latch assembly 100) may be removed from the frame 20, such as by lifting the latch assembly 100 (and/or the load floor 14) upwardly in the direction of arrow A.

In order to secure the latch assembly 100 (and therefore the load floor 14) to the frame 20, the latch 104 may be rotated in a counterclockwise direction in the direction of arc B, or a clockwise direction in the direction of arc C. As the latch 104 is rotated in either direction, one of the latching rims 114 rotates out of the rim passage 170 of the latch assembly (shown in FIG. 6), and into the latch opening 202, which is aligned with the rim passage 170.

Figure 10:
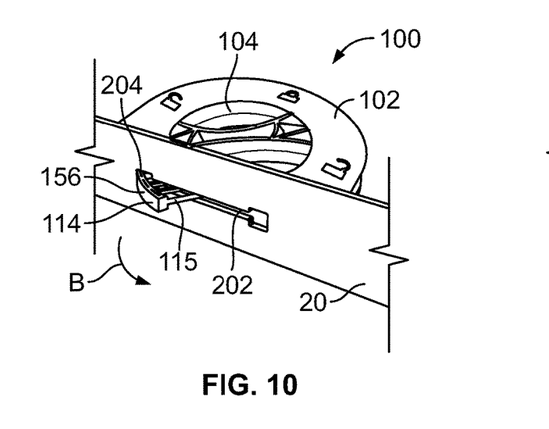
FIG. 10 illustrates a perspective top view of a latch of a latch assembly rotating into an engaged position with the frame, according to an embodiment of the present disclosure.

FIG. 10 illustrates a perspective top view of the latch 104 of the latch assembly 100 rotating into an engaged position with the frame 20, according to an embodiment of the present disclosure. As the latch 104 is rotated relative to the housing 102, the latching rim 114 rotates through the rim passage 170 (hidden from view in FIG. 10) and into and through the latch opening 202. As shown, an engaging wall 156 passes through an end channel 204 of the latch opening 202, while the recessed panel 115 passes through the central channel 206.

Figure 11:
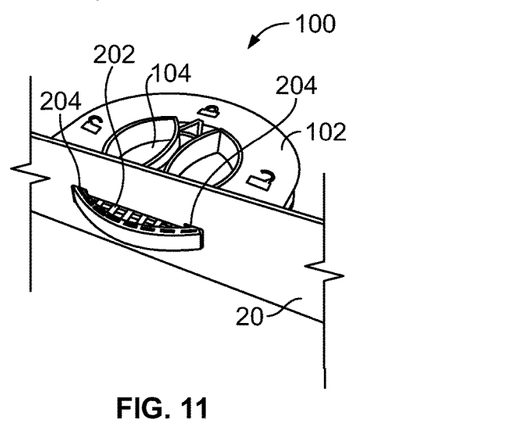
FIG. 11 illustrates a perspective top view of a latch assembly in a fully engaged position with a frame, according to an embodiment of the present disclosure.

FIG. 11 illustrates a perspective top view of the latch assembly 100 in a fully engaged position with the frame 20, according to an embodiment of the present disclosure. The latching rim 114 extends fully through the rim passage 170 (hidden from view) and the latch opening 202 of the frame 20, thereby securely latching the latch assembly 100 (and therefore the load floor 14 attached to the latch assembly 100) to the frame 20. The latching rim 114 abuts into edge portions of the frame 20 that define the latch opening 202, which provide a barrier that restricts movement of the latching rim 114 and therefore the latch assembly 100 (and the load floor 14) relative to the frame 20. As shown, in the full engaged position, the latching rim 114 may fully extend through the latch opening 202 from one end channel 204 to an opposite end channel 204.

In order to remove the latch assembly 100 (and therefore the load floor 14), the latch 104 is rotated relative to the housing 90 degrees (in either a clockwise or counterclockwise direction) so that the latching rim 114 no longer extends through the latch opening 202, but recedes into the housing 102, such as shown in FIG. 9. As such, the latch assembly 100 (and therefore the load floor 14) may be removed from the frame 20.

Figure 12:
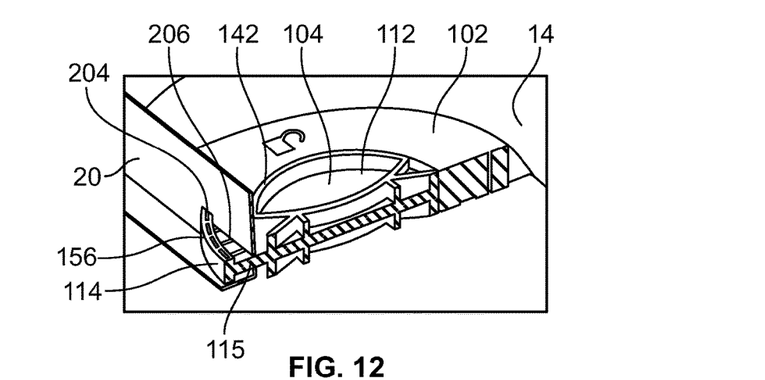
FIG. 12 illustrates a perspective cutaway view of a latch assembly in a fully engaged position with a frame, according to an embodiment of the present disclosure.

FIG. 12 illustrates a perspective cutaway view of the latch assembly 100 in a fully engaged position with the frame 20, according to an embodiment of the present disclosure. In the fully engaged position, the engaging wall 156 may extend through the end channel 204 of the latch opening 202, while the flat recessed panel 115 may extend through the central channel 205. Further, an outer surface of the outer wall 142 of the central hub 112 of the latch 104 may abut into an interior surface of the frame 20 to provide stability.

As described above, the latch assembly 100 may be used to secure the load floor 14 to the frame 20 such that either a first surface or a second surface that is opposite from the first surface is in an upright orientation. The latch assembly 100 includes the symmetrical latch 104 that is configured to provide a reversible load floor with the same fastening method on both sides of the load floor.

Referring to FIGS. 1-12, the load floor 14 may be loaded into a recess within the cargo area 12 of the vehicle 10. The latch assembly 100 may be rotated 90 degrees into an engagement position to lock the load floor 14 in position with respect to the frame 20. In at least one embodiment, the rotation of the latch 104 may overcome a resisting force, such as exerted by one or more detents, interfering structures, and/or the like to move from a disengaged or unlocked position to an engagement or locked position.

In order to flip the load floor 14 over to the opposite side (carpet side to rubber side, for example), the latch 104 may be rotated again 90 degrees to move from the engagement position to the disengaged position. Once flipped over, a similar process as described above is used to lock the load floor 14 to the frame 20.

In at least one embodiment, a lift handle may be secured to at least one portion (such as each side) of the latch 104 and/or the housing 102 to lift the load floor 14 up when the latch 104 is in the disengaged position. In at least one embodiment, a lift handle may be secured to the load floor 14.

The latch 104 may be symmetrical, as described above. The latch assembly 100 provides simple, intuitive operation. Further, the latch assembly 100 provides multi-directional latch control (e.g., clockwise or counter-clockwise operation).

Figure 13:
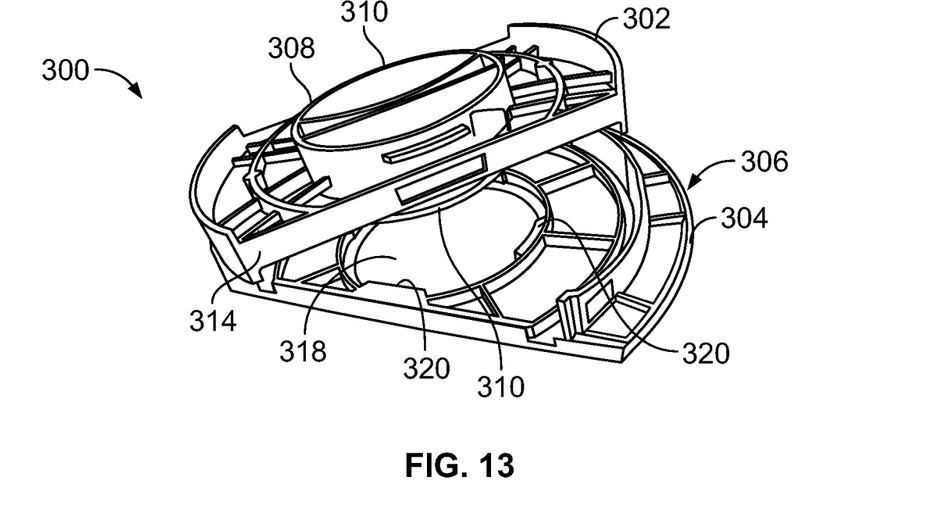
FIG. 13 illustrates a perspective top view of a latch assembly including a latch disconnected from a base of a housing, according to an embodiment of the present disclosure.

FIG. 13 illustrates a perspective top view of a latch assembly 300 including a latch 302 disconnected from a base 304 of a housing 306, according to an embodiment of the present disclosure. The latch assembly 300 is similar to the latch assembly 100 described above.

Figure 14:
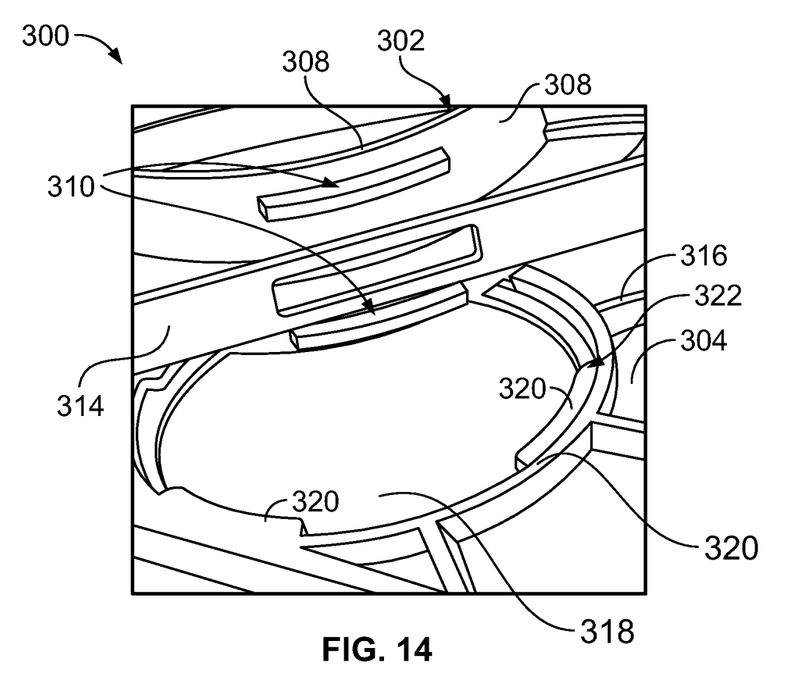
FIG. 14 illustrates a perspective close-up view of a central hub of a latch disconnected from a base, according to an embodiment of the present disclosure.

FIG. 14 illustrates a perspective close-up view of a central hub 308 of the latch 302 disconnected from the base 304, according to an embodiment of the present disclosure. Referring to FIGS. 13 and 14, the central hub 308 may include arcuate planar tabs 310 extending radially outward from an outer wall 312 of the central hub 308 above and below a main body 314.

A central ridge 316 defining a circular opening 318 of the base 304 may include flanges 320 that radially extend towards the opening 318. One or more of the flanges 320 may include a resilient member 322, such as flexible tip, tail, beam, post, and/or the like.

In operation, the tabs 310 are configured to engage the flanges 320 to interlock or otherwise secure the housing 306 to the latch 302 during normal use. To assemble the latch 302 to the housing 306, the latch 306 may be positioned 45 degrees from either a locked or unlocked position, which allows the tabs 310 to fall into the spaces between the flanges 320 (which may be the same for both upper and lower housing components). When the latch 302 is rotated to either the 0 or 90 degree position, the tabs 310 and the flanges 320 are positioned on each other. Either of 0 or 90 degree positions may be the primary modes that the latch 302 is used. Accordingly, the interaction between the tabs 310 and the flanges 320 may securely connect the upper and lower housing components together.

In at least one embodiment, as the latch 302 is rotated relative to the housing 306 (as described above), the tabs 310 may slide into secure engagement above and below the flanges 320. When turned 45 degrees in either direction, the tabs 310 may be captured by the flanges 320, or vice versa, thereby securing the latch 302 to the housing 306. The resilient members 322 may be configured to resiliently engage (such as through a snap fit, or the like) one or more reciprocal features of the tabs 310 to provide an index between the latch 302 and the housing 306. For example, the tabs 310 may deflect the resilient members 322 into an indexing position, which may be indicated by a respective click, for example.

Figure 15:
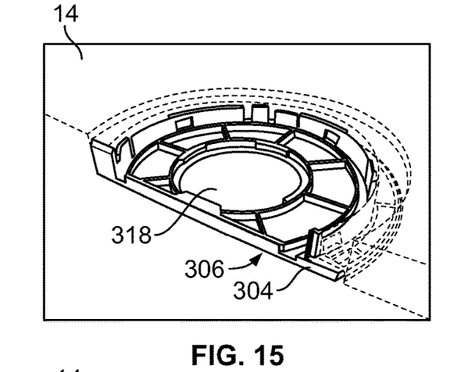
FIG. 15 illustrates a perspective top view of a base of a housing secured to a load floor, according to an embodiment of the present disclosure.

FIG. 15 illustrates a perspective top view of the base 304 of the housing 306 secured to the load floor 14, according to an embodiment of the present disclosure. The base 304 is secured within a reciprocal channel of the load floor 14, as described above.

Figure 16:
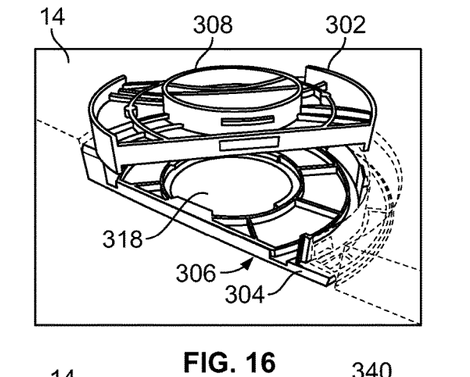
FIG. 16 illustrates a perspective top view of a latch positioned over a base of a housing, according to an embodiment of the present disclosure.

FIG. 16 illustrates a perspective top view of the latch 302 positioned over the base 304 of the housing 306, according to an embodiment of the present disclosure. The latch 302 is aligned with the base 304, such that the central hub 308 is aligned with the central opening 318 of the base 304, as described above.

Figure 17:
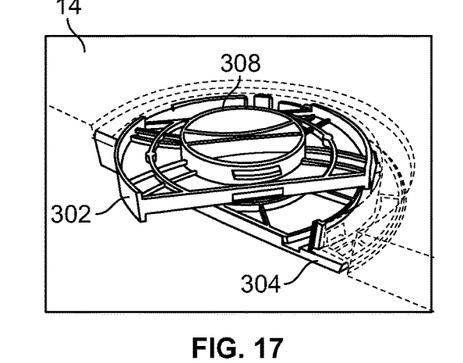
FIG. 17 illustrates a perspective top view of a latch in relation to a base of a housing, according to an embodiment of the present disclosure.

FIG. 17 illustrates a perspective top view of the latch 302 in relation to the base 304 of the housing 306, according to an embodiment of the present disclosure. The central hub 308 may be free and moveable within the central opening 318 of the base 304.

Figure 18:
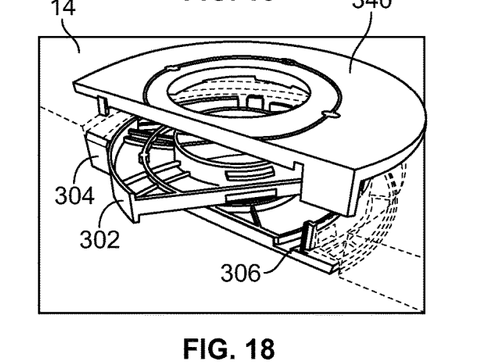
FIG. 18 illustrates a perspective top view of a cover positioned over a latch and a base, according to an embodiment of the present disclosure.

FIG. 18 illustrates a perspective top view of a cover 340 positioned over the latch 302 and the base 304, according to an embodiment of the present disclosure. The cover 304 secures to the base 304, in a similar fashion as described above, to fully form the housing 306.

Figure 19:
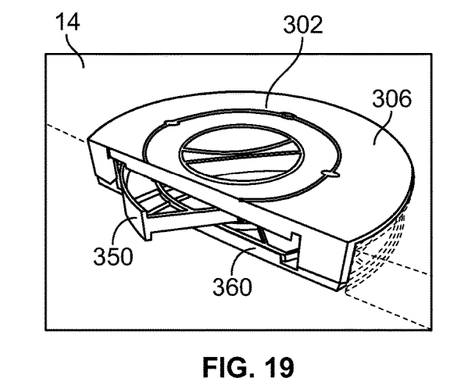
FIG. 19 illustrates a perspective top view of a latching rim extending out of an opening of a housing, according to an embodiment of the present disclosure.

FIG. 19 illustrates a perspective top view of a latching rim 350 extending out of a rim passage 360 of the housing 306, according to an embodiment of the present disclosure. The rim passage 360 of the housing 306 (like the rim passage 170 of the housing 102 shown and described with respect to FIG. 6, for example) may be sized and shaped in the same manner as the opening 202 formed through the frame 20 (shown in FIG. 8.

Figure 20:
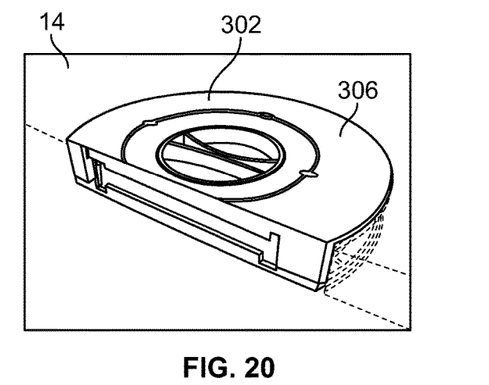
FIG. 20 illustrates a perspective top view of a latch in a disengaged position, according to an embodiment of the present disclosure.

FIG. 20 illustrates a perspective top view of a latch 302 in a disengaged position, according to an embodiment of the present disclosure. In the disengaged position, the latch 302 may be indexed with respect to the housing 306, as described above with respect to FIGS. 13 and 14. In order to index the latch 302 to the housing 306, the latch 302 may be rotated 45 degrees clockwise in relation to the position shown in FIG. 19.

As shown in FIG. 19, the latch 302 may be secured at a 45 degree radial angle with respect to the housing 306. The latch may then be turned, such as through a 45 degree clockwise radial angle, in order to index the latch 302 with respect to the housing 306, as shown in FIG. 20.

In at least one embodiment, a portion of the housing 306 may include an arc-shaped recess. The recess may be shaped to have a radius that coaxial with a center of the latch 302. As such, the arc-shaped recess provides an unimpeded view of the latch 302 as it is fully engaged. Further, the recess provides an opening through which an individual may easily see and lift the load floor without the aid of an additional handle or lift feature.

Referring to FIGS. 1-20, embodiments of the present disclosure provide compact and efficient systems and methods of securing a load floor of a cargo area to a structural portion of a vehicle. Further, embodiments of the present disclosure provide systems and methods that may quickly and efficiently secure a load floor in multiple positions using one latch assembly.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A latch assembly that is configured to removably secure a load floor within a cargo area of a vehicle, the latch assembly comprising:
   a housing defining an opening, wherein the housing is configured to secure to the load floor; and
   a latch rotatably secured to the housing, wherein the latch comprises a central hub and opposed latching rims extending radially outward from the central hub, wherein the latch is configured to be rotated 360° in relation to the housing in both a clockwise direction and counterclockwise direction to move either of the latching rims out of the housing and into an engagement position, and wherein the latch assembly is configured to secure to a portion of the vehicle when either of the latching rims is in the engagement position.

2. The latch assembly of claim 1, wherein the latch assembly is configured to removably secure the load floor to the portion of the vehicle in at least two different orientations, and wherein the latch operates to secure to the portion of the vehicle in the same manner when the load floor is in each of the at least two different orientations.

3. The latch assembly of claim 1, wherein the latch is symmetrical about a central longitudinal axis.

4. The latch assembly of claim 1, wherein the housing comprises a base secured to a cover, wherein the base mirrors the cover.

5. The latch assembly of claim 1, wherein the central hub comprises an upstanding rib between two cavities exposed through the opening, wherein the rib provides an engagement member that is configured to be grasped by an individual to rotate the latch in relation to the housing.

6. The latch assembly of claim 1, wherein the housing comprises a rim passage at an end, wherein the rim passage allows each of the latching rims to move out of the housing.

7. The latch assembly of claim 1, wherein each of the latching rims comprises an arcuate engaging wall extending above and below a recessed panel that extends radially outward from the central hub.

8. The latch assembly of claim 1, wherein a portion of the vehicle comprises a retaining passage that is sized and shaped to conform to a profile of the latching rims.

9. The latch assembly of claim 1, wherein the housing comprises a plurality of flanges that radially extend towards the opening, wherein the central hub comprises a plurality of arcuate tabs extending radially outward from the central hub, and wherein the plurality of flanges rotatably engage the plurality of tabs to rotatably secure the latch to the housing.

10. The latch assembly of claim 9, wherein at least one of the plurality of flanges is configured to cooperate with at least one of the plurality of arcuate tabs to index the latch with respect to the housing.

11. A securing system within a cargo area of a vehicle, the securing system comprising:
    a load floor removably secured within the cargo area, wherein the load floor includes a first surface that is opposite from a second surface, and wherein the load floor is configured to be selectively flipped between first and second orientations that expose the first and second surfaces, respectively;

a latch assembly secured to the load floor, wherein the latch assembly removably secures the load floor to a portion of the vehicle in the first and second orientations, wherein the latch assembly comprises:

a housing defining an opening, wherein the housing secures to the load floor; and a latch rotatably secured to the housing, wherein the latch comprises a central hub and opposed latching rims extending radially outward from the central hub, wherein the latch is rotatable 360° in relation to the housing in both a clockwise direction and counterclockwise direction to move either of the latching rims out of the housing and into an engagement position, and wherein the latch assembly secures to the portion of the vehicle when either of the latching rims is in the engagement position.

12. The securing system of claim 11, wherein the latch operates to secure to the portion of the vehicle in the same manner when the load floor is in each of the first and second orientations.

13. The securing system of claim 11, wherein the latch is symmetrical about a central longitudinal axis.

14. The securing system of claim 11, wherein the housing comprises a base secured to a cover, wherein the base mirrors the cover.

15. The securing system of claim 11, wherein the central hub comprises an upstanding rib between two cavities exposed through the opening, wherein the rib provides an engagement member that is configured to be grasped by an individual to rotate the latch in relation to the housing.

16. The securing system of claim 11, wherein the housing comprises a rim passage at an end, wherein the rim passage allows each of the latching rims to move out of the housing.

17. The securing system of claim 11, wherein the portion of the vehicle comprises a retaining passage that is sized and shaped to conform to a profile of the latching rims.

18. The securing system of claim 11, wherein the housing comprises a plurality of flanges that radially extend towards the opening, wherein the central hub comprises a plurality of arcuate tabs extending radially outward from the central hub, and wherein the plurality of flanges rotatably engage the plurality of tabs to rotatably secure the latch to the housing.

19. The securing system of claim 18, wherein at least one of the plurality of flanges is configured to cooperate with at least one of the plurality of arcuate tabs to index the latch with respect to the housing.

20. A latch assembly that is configured to removably secure a load floor within a cargo area of a vehicle, the latch assembly comprising:

a housing including a base secured to a cover, an opening formed through one or both of the base and the cover, and a plurality of flanges that radially extend towards the opening, wherein the base mirrors the cover, wherein the housing is configured to secure to the load floor; and a latch rotatably secured to the housing, wherein the latch is symmetrical about a central longitudinal axis, wherein the latch comprises a central hub and opposed latching rims extending radially outward from the central hub, wherein the central hub comprises an engagement member exposed through the opening and configured to be grasped by an individual to rotate the latch in relation to the housing, wherein the central hub further comprises a plurality of arcuate tabs extending radially outward from the central hub, wherein the plurality of flanges rotatably engage the plurality of tabs to rotatably secure the latch to the housing, wherein each of the latching rims comprises an arcuate engaging wall extending above and below a recessed panel that extends radially outward from the central hub, wherein the latch is configured to be rotated in relation to the housing in both a clockwise direction and counterclockwise direction to move either of the latching rims out of the housing into an engagement position, and wherein the latch assembly is configured to secure to a portion of the vehicle when the either of the latching rims is in the engagement position, wherein the latch assembly is configured to removably secure the load floor to the portion of the vehicle in at least two different orientations, and wherein the latch operates to secure to the portion of the vehicle in the same manner when the load floor is in each of the at least two different orientations, and wherein the latch is configured to be indexed with respect to the housing.

* * * * *